(12) United States Patent
Kim

(10) Patent No.: US 11,755,052 B1
(45) Date of Patent: Sep. 12, 2023

(54) FOLDABLE PEDAL DEVICE FOR VEHICLE

(71) Applicants: Hyundai Motor Company, Seoul (KR); Kia Corporation, Seoul (KR)

(72) Inventor: Eun Sik Kim, Gwangmyeong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/869,129

(22) Filed: Jul. 20, 2022

(30) Foreign Application Priority Data

Apr. 12, 2022 (KR) ........................ 10-2022-0045302

(51) Int. Cl.
| | | |
|---|---|---|
| G05G 1/40 | (2008.04) | |
| G05G 1/44 | (2008.04) | |
| G05G 5/05 | (2006.01) | |
| G05G 1/015 | (2008.04) | |
| B60T 7/04 | (2006.01) | |
| B60K 26/02 | (2006.01) | |
| B60T 7/06 | (2006.01) | |

(52) U.S. Cl.
CPC .............. *G05G 1/40* (2013.01); *G05G 1/015* (2013.01); *G05G 1/44* (2013.01); *G05G 5/05* (2013.01); *B60K 26/02* (2013.01); *B60K 2026/026* (2013.01); *B60T 7/042* (2013.01); *B60T 7/06* (2013.01); *G05G 2505/00* (2013.01)

(58) Field of Classification Search
CPC ..... G05G 1/40; G05G 1/015; B60K 2026/026
See application file for complete search history.

(56) References Cited

U.S. PATENT DOCUMENTS 10,906,514 B1 * 2/2021 Kim ..................... G05G 5/03
11,021,058 B1 * 6/2021 Kim ..................... G05G 5/28

FOREIGN PATENT DOCUMENTS

| KR | 10-2021-0125733 | 10/2021 |
| KR | 10-2023-0096205 | 6/2023 |

* cited by examiner

*Primary Examiner* — Vicky A Johnson
(74) *Attorney, Agent, or Firm* — MORGAN, LEWIS & BOCKIUS LLP

(57) ABSTRACT

A foldable pedal device for a vehicle is configured to cause a pedal pad to protrude toward a driver to be exposed in a pop-up state so that the driver can operate the same in a manual driving mode in which the driver directly drives the vehicle, and to cause the pedal pad to be hidden in a hidden state so that the pedal pad is not exposed to the driver and the drive cannot operate the same in an autonomous driving situation.

20 Claims, 14 Drawing Sheets

US 11,755,052 B1

FOLDABLE PEDAL DEVICE FOR VEHICLE

CROSS-REFERENCE TO THE RELATED APPLICATION

The present application claims priority to Korean Patent Application No. 10-2022-0045302, filed on Apr. 12, 2022, the entire contents of which is incorporated herein for all purposes by this reference.

BACKGROUND OF THE PRESENT DISCLOSURE

Field of the Present Disclosure

The present disclosure relates to a foldable pedal device for a vehicle, and more particularly to technology related to a foldable pedal device for a vehicle configured to cause a pedal pad to protrude toward a driver to be exposed so that the driver can operate the same in a manual driving mode in which the driver directly drives the vehicle, and to cause the pedal pad to be hidden so that the pedal pad is not exposed to the driver and the driver cannot operate the same in an autonomous driving situation.

Description of Related Art

Recently, an autonomous vehicle has been rapidly developed as a smart vehicle using autonomous driving technology configured to enable a vehicle to reach a destination without direct operation of a steering wheel, an accelerator pedal, and a brake by a driver.

When an autonomous driving situation is generally realized, it is possible to select any one of a manual driving mode, in which a driver directly drives a vehicle, and an autonomous driving mode, in which a vehicle is capable of sensing its environment and moving safely to reach a destination by itself without involvement of a driver.

In the autonomous driving mode, the driver wants to stretch out his or her feet to rest comfortably. However, when pedals such as an accelerator pedal and a brake pedal located in a lower space of a driver's seat are exposed to the interior of the vehicle, the driver may not be able to rest comfortably.

Furthermore, the autonomous driving situation is a situation in which the driver does not operate the vehicle's pedals such as the accelerator pedal and the brake pedal. However, when the driver operates the pedals during autonomous driving, a vehicle controller is configured to determine that the driver wants to terminate the autonomous driving and to directly drive the vehicle, which causes the vehicle controller to terminate control for the autonomous driving.

However, because the vehicle's pedals are provided to be exposed to the lower space of the driver's seat, the driver may unconsciously operate the pedals (erroneous operation of the pedal) in the autonomous driving situation. In the instant case, a vehicle accident may occur depending on road conditions or a distance between vehicles.

Therefore, it is necessary to develop technology related to a pedal device for a vehicle, configured to cause a pedal pad to protrude toward a driver to be exposed so that the drive can operate the same in the manual driving mode in which the driver directly drives the vehicle, and to prevent the pedal pad from being exposed to the driver so that the driver cannot operate the same, securing a comfortable rest of the driver and preventing erroneous operation of the pedal in the autonomous driving situation.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a foldable pedal device for a vehicle, configured to cause a pedal pad to protrude toward a driver to be exposed (to pop up) so that the driver can operate the same in a manual driving mode in which the driver directly drives the vehicle, and to cause the pedal pad to be hidden so that the pedal pad is not exposed to the driver and the driver cannot operate the same in an autonomous driving situation. Accordingly, in the autonomous driving situation, the driver may comfortably rest, and furthermore, it is possible to improve safety by preventing erroneous operation of the pedal in the autonomous driving situation.

Various aspects of the present disclosure are directed to providing a foldable pedal device for a vehicle configured to minimize the number of components by simplifying a mechanism of a folding function of a pedal as much as possible, reducing costs and weight and simplifying layout.

It is a further object of the present disclosure to provide a foldable pedal device for a vehicle which is an organ-type electronic pedal device including a high-load spring module and a hysteresis lever, configured to tune a pedal effort, a stroke, and a hysteresis operation force, which are differently required depending on vehicle models, by changing a component of the hysteresis lever, achieving cost reduction.

In accordance with various aspects of the present disclosure, the above and other objects may be accomplished by the provision of a foldable pedal device for a vehicle, the foldable pedal device including a pedal housing, a pedal pad rotatably coupled to the pedal housing and configured to be operated by a driver, a spring module engaged to the pedal pad and configured to provide an elastic force to the pedal pad so that the pedal pad protrudes from the pedal housing, and a moving stopper coupled to an actuator and configured to be linearly moved by power of the actuator fixed to the pedal housing, wherein the pedal pad rotates in a first direction to be inserted into the pedal housing by movement of the moving stopper, entering a hidden state configured to prevent the driver from operating the pedal pad in an autonomous driving situation of the vehicle, and the pedal pad rotates in a second direction to protrude from the pedal housing by the movement of the moving stopper and the elastic force of the spring module, entering a pop-up state configured to allow the driver to operate the pedal pad in a manual operation mode of the vehicle.

The foldable pedal device may further include a hysteresis lever rotatably provided on the pedal housing, the hysteresis lever including an upper portion inserted into the pedal pad to contact with an internal surface of the pedal pad and generating hysteresis by frictional force with the pedal pad when the pedal pad rotates.

The pedal pad may include a pad portion including a pad surface configured to be pressed by the driver, wherein one end portion of the spring module is inserted into and provided in the pad portion and having an upper portion of the hysteresis lever inserted thereinto to be in contact therewith, and a pedal arm portion including a first end portion connected to the pad portion and a second end portion pivotally coupled to the pedal housing.

The pedal arm portion and the moving stopper may contact each other when the pedal pad is in the pop-up state, in the hidden state, in a transition state from the pop-up state to the hidden state, and in a transition state from the hidden state to the pop-up state.

The pedal arm portion and the moving stopper may contact each other when the driver does not operate the pedal pad in the pop-up state, and contact between the pedal arm portion and the moving stopper may be released when the driver operates the pedal pad in the pop-up state and the pedal pad rotates in the first direction.

The foldable pedal device may further include a permanent magnet coupled to the pedal pad, and a printed circuit board (PCB) coupled to the pedal housing to face the permanent magnet, wherein the PCB is configured to recognize a change in magnetic flux of the permanent magnet when the pedal pad rotates, and generates a signal related to a pedal function.

The PCB may not generate the signal related to the pedal function to prevent erroneous operation when the pedal pad rotates to enter the hidden state or the pop-up state by movement of the moving stopper according to operation of the actuator and as such a position of the permanent magnet changes.

The PCB may generate the signal related to the pedal function only when the pedal pad protrudes from the pedal housing to be in the pop-up state and a position of the permanent magnet changes while the pedal pad rotates in the first direction in response to operation of the driver in a non-operating state of the actuator.

The actuator may include a motor fixed to the pedal housing, the motor being rotatable in a clockwise direction or a counterclockwise direction, a lead screw configured to be rotated by power of the motor and screwed to the moving stopper, and a gear member gear-engaged between the lead screw and the motor and configured to transmit the power of the motor to the lead screw through the gear member.

The motor may be formed of at least two motors.

The moving stopper may include a moving portion screwed to the lead screw and configured to move linearly in a longitudinal direction of the lead screw when the lead screw rotates by the motor, and a stopper portion including a first end portion connected to the moving portion and a second end portion crossing a pedal arm portion of the pedal pad to slidably contact with an upper surface of the pedal arm portion.

The moving stopper may further include a circular protrusion provided at a bottom portion of the moving portion and configured to line-contact with the pedal housing.

The pedal arm portion may include a bending portion bent at a predetermined angle so that the second end portion of the stopper portion selectively contacts with an upper surface of the bending portion, and the upper surface of the bending portion may be located above a movement trajectory of the stopper portion and may be formed not to be parallel to the movement trajectory.

The moving portion may include a rubber damper coupled thereto, and the rubber damper may be elastically deformed by contacting with the pedal arm portion to generate a pedal effort when the driver operates the pedal pad in the pop-up state and the pedal pad rotates in the first direction.

The pedal arm portion may include an avoidance hole formed therein, and the rubber damper may be inserted into the avoidance hole when the moving stopper moves in a second direction and the pedal pad rotates in the first direction to be inserted into the pedal housing and to be in the hidden state.

The avoidance hole may be formed to be greater than the rubber damper to prevent the rubber damper from being deformed by the pedal arm when the rubber damper is inserted into the avoidance hole.

The foldable pedal device may further include a plurality of stroke sensors fixed to the pedal housing, connected to the pedal pad, and configured to generate a signal related to a pedal function when the pedal pad rotates.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
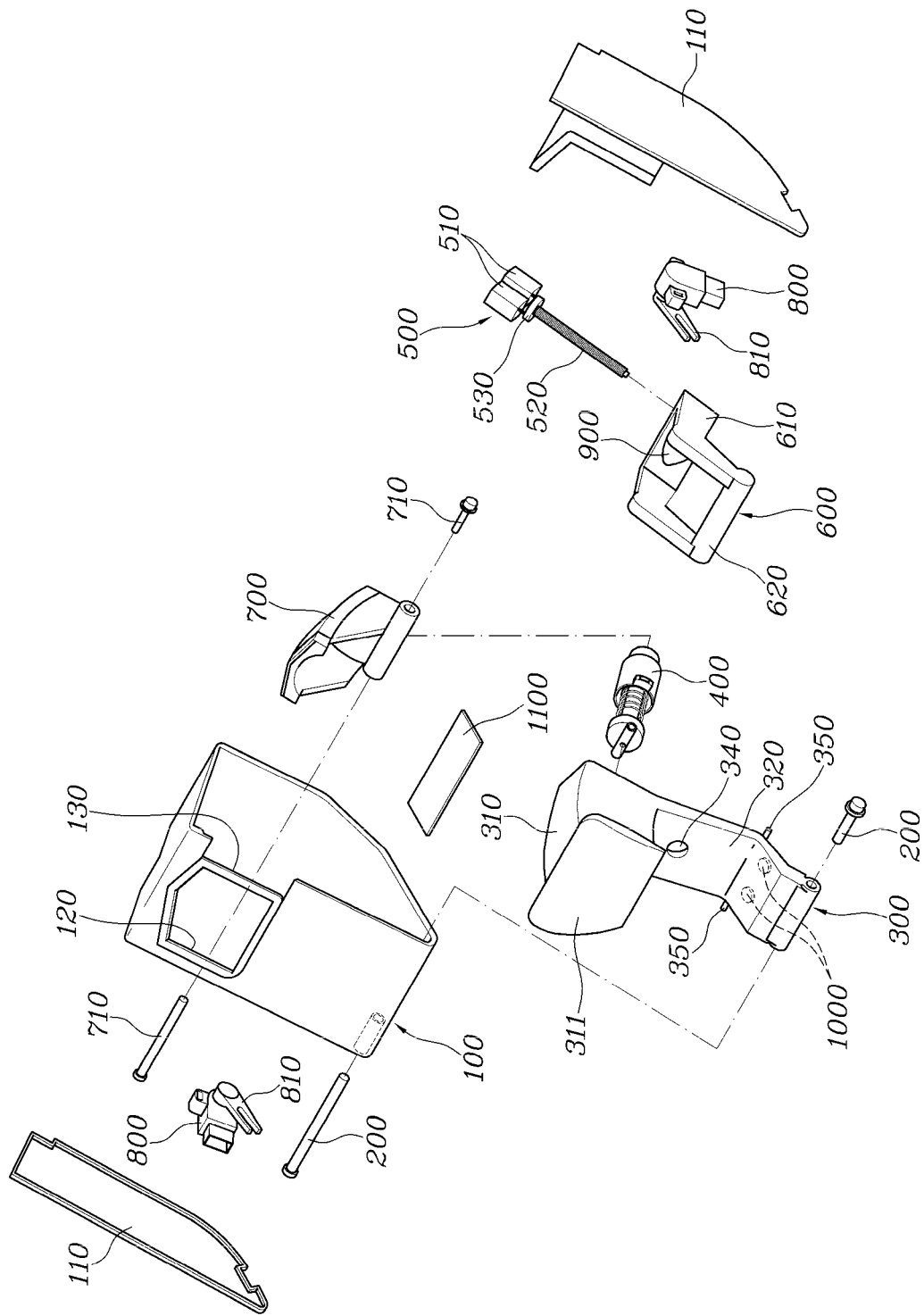
FIG. 1 is an exploded view of a foldable pedal device according to an exemplary embodiment of the present disclosure.
Figure 2:
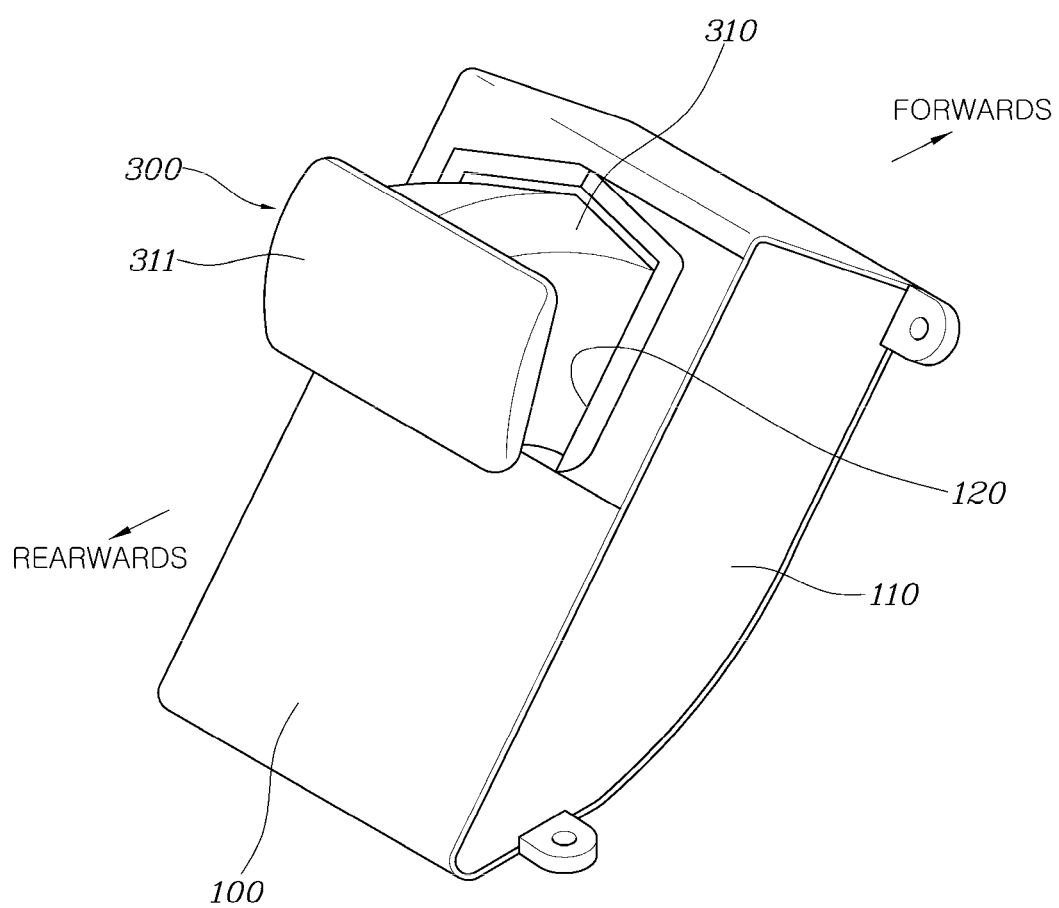
FIG. 2 is view showing a coupling state of FIG. 1, in which a pedal pad pops up.
Figure 3:
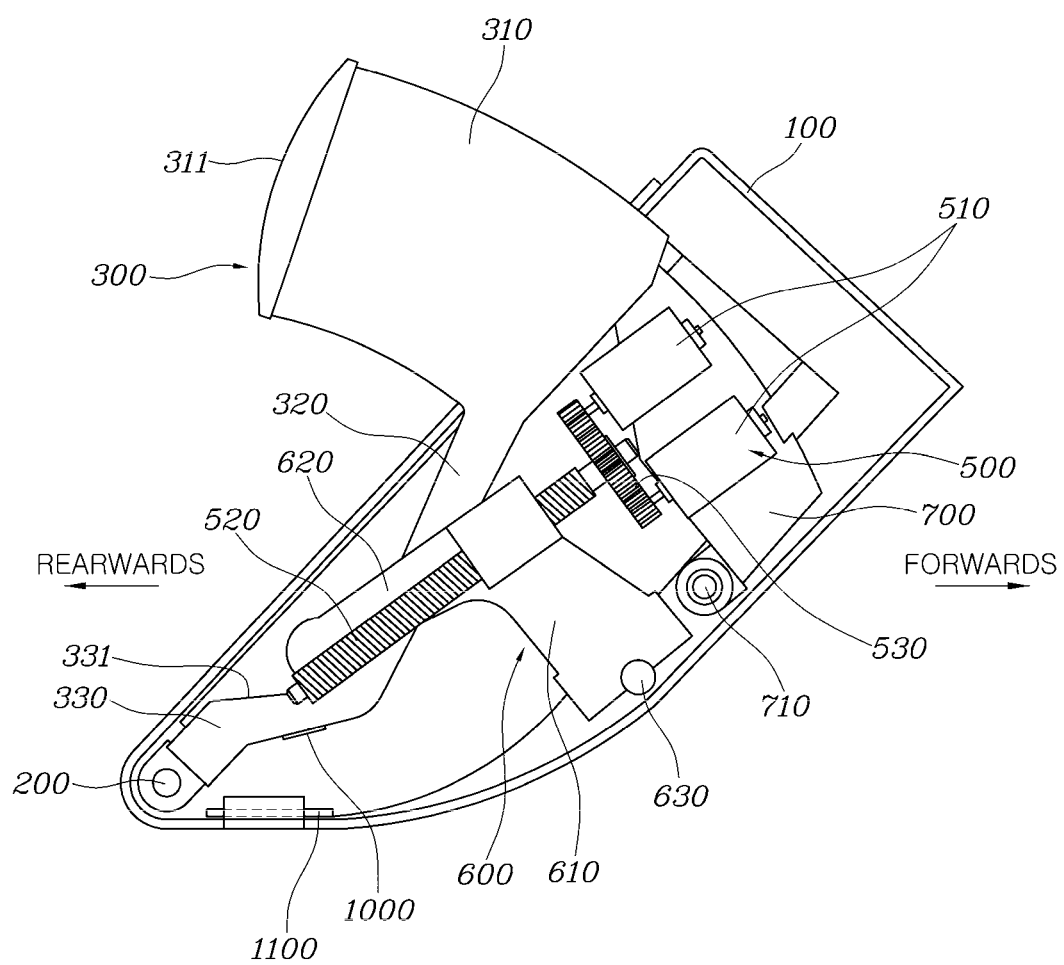
FIG. 3 is a side view showing an internal structure of FIG. 2.
Figure 4:
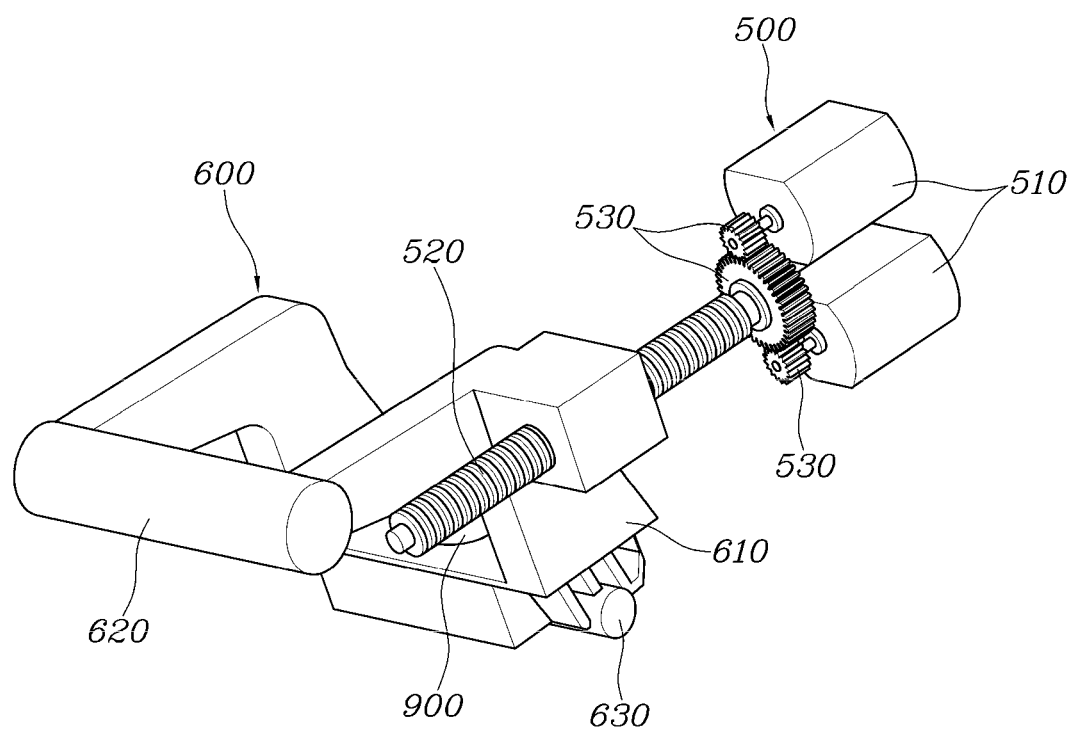
FIG. 4 is a view showing a coupling state between an actuator and a moving stopper according to an exemplary embodiment of the present disclosure.
Figure 5:
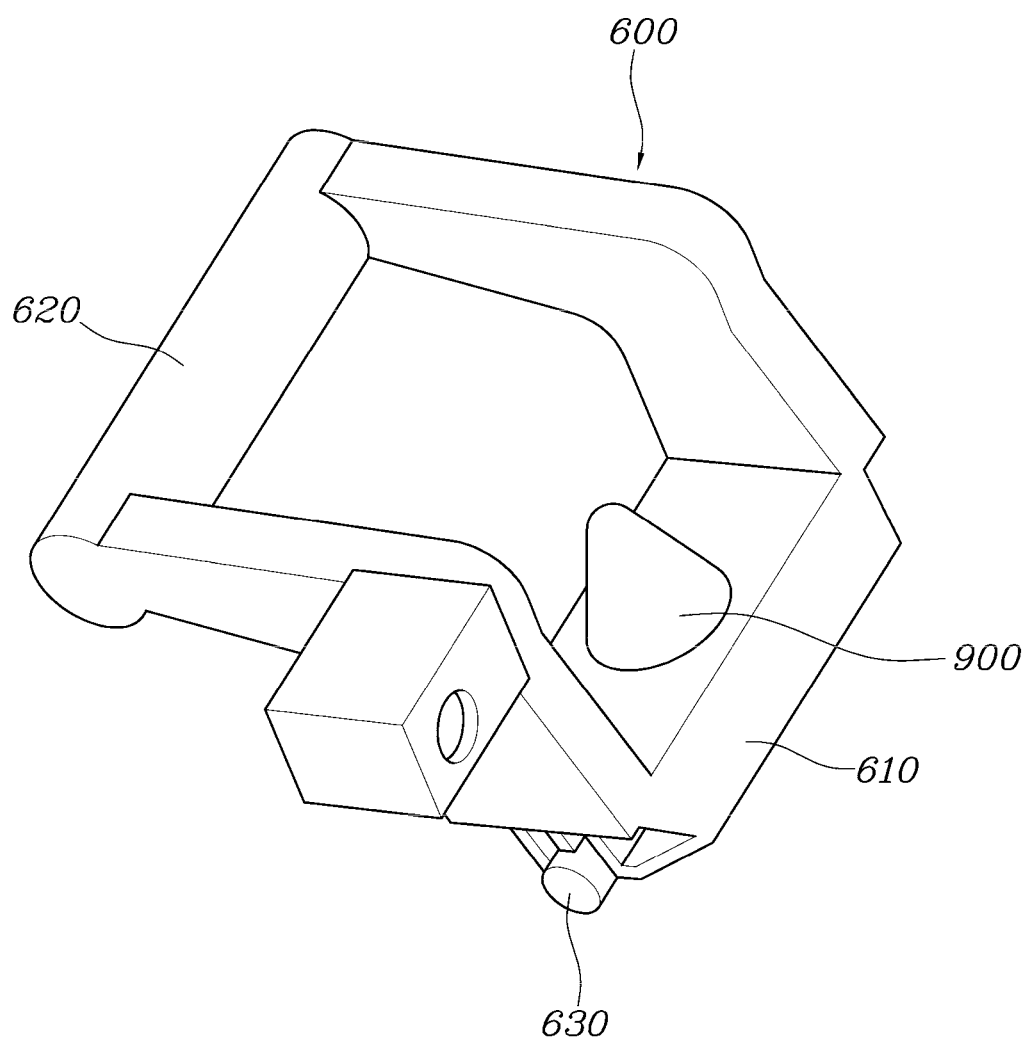
FIG. 5 is a view of the moving stopper according to an exemplary embodiment of the present disclosure.
Figure 6:
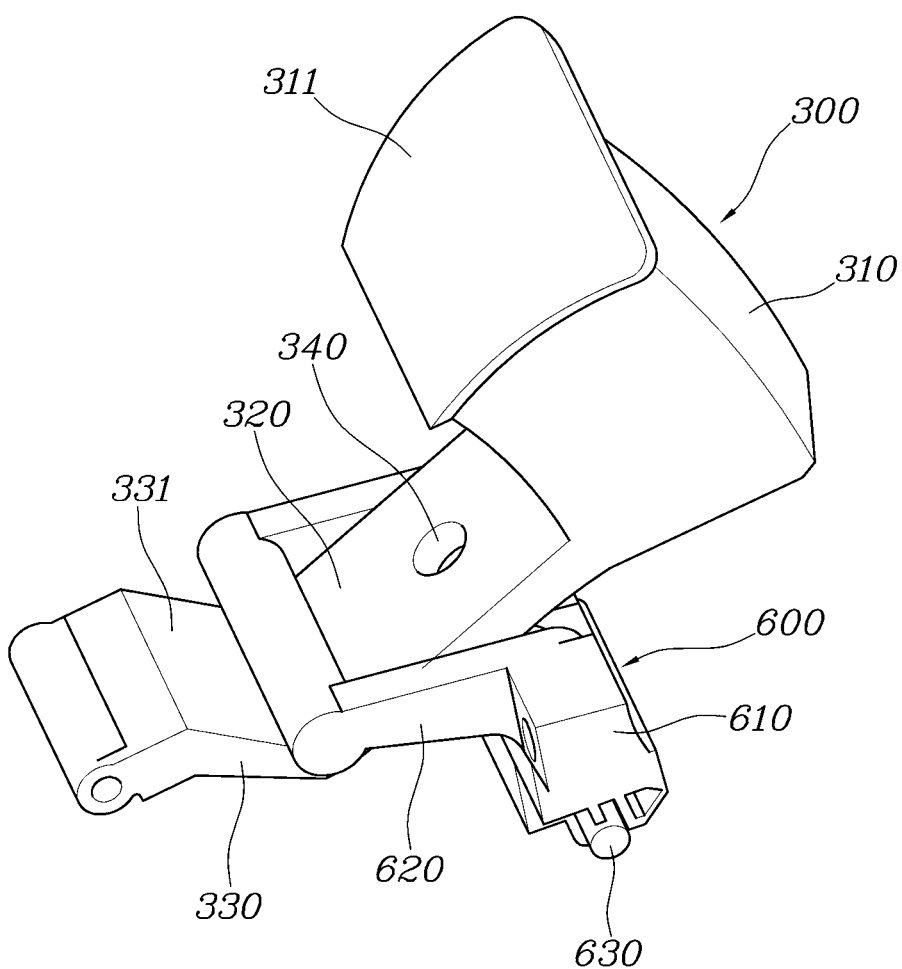
FIG. 6 is a view showing the pedal pad and the moving stopper according to an exemplary embodiment of the present disclosure.
Figure 7:
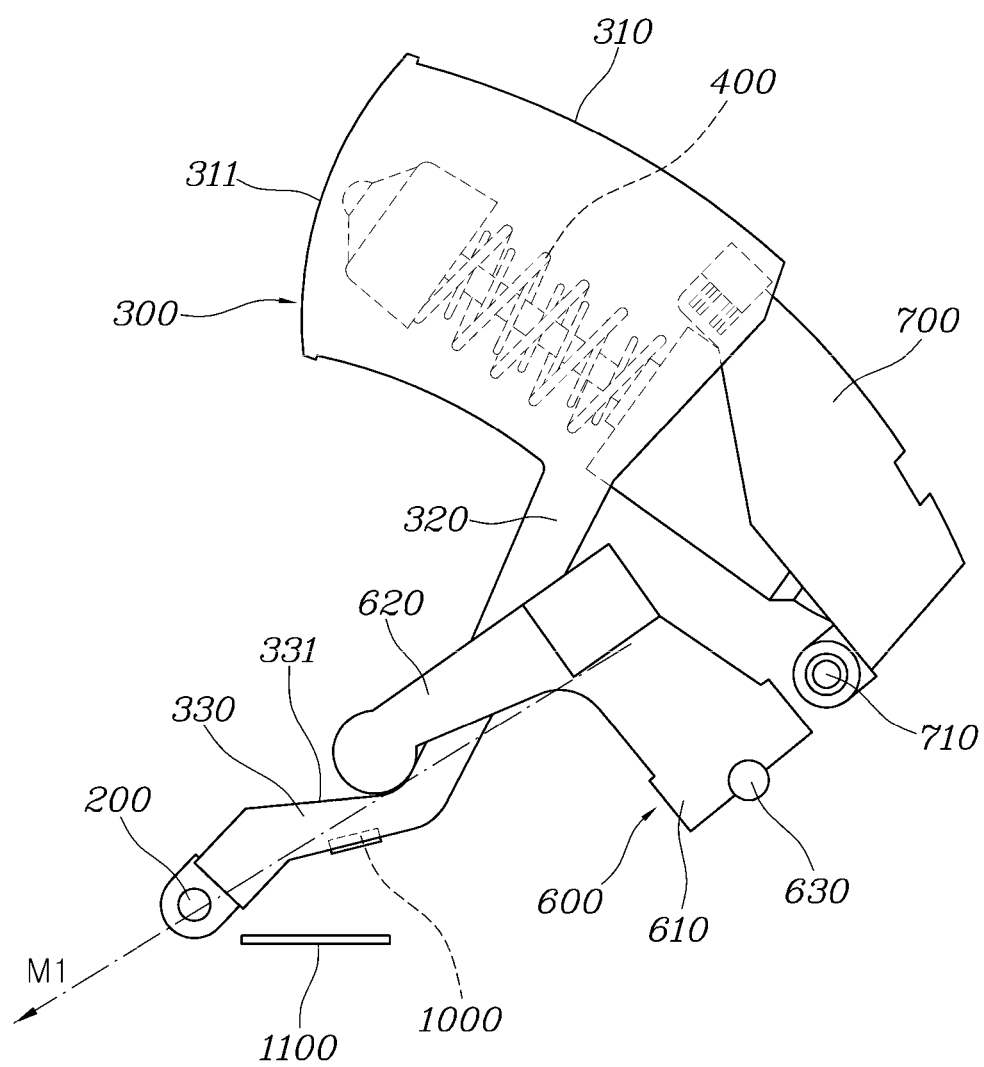
FIG. 7 is a view showing the state in which a pedal housing is removed in FIG. 3.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions made in connection with the embodiments of the present disclosure disclosed in the specification or the application are merely illustrative for the purpose of describing embodiments according to an exemplary embodiment of the present disclosure. Furthermore, the present disclosure may be implemented in various forms, and should not be construed as being limited to the embodiments described in the specification or the application.

Since the exemplary embodiments of the present disclosure may be variously modified and may have various forms, specific embodiments are illustrated in the drawings and described in detail in the specification or the application. However, it should be understood that the embodiments according to the concept of the present disclosure are not intended to be limited to the specific disclosed forms, and include all modifications, equivalents, and substitutes that fall within the spirit and technical scope of the present disclosure.

Meanwhile, in an exemplary embodiment of the present disclosure, terms such as "first" and/or "second" may be used to describe various components, but the components are not limited by the terms. The terms are used only for distinguishing one component from other components. For example, a first component may be referred to as a second component, and similarly, a second component may also be referred to as a first component without departing from the scope of rights according to the concept of the present disclosure.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that no other components are present therebetween. Other expressions for the description of relationships between components, such as "between" and "directly between" or "adjacent to" and "directly adjacent to", should be interpreted in the same manner.

The terms used in the specification are only used to describe specific embodiments, and are not intended to limit the present disclosure. In the exemplary embodiment, an expression in a singular form also includes the plural sense, unless clearly specified otherwise in context. It should be understood that expressions such as "comprise" and "have" in the exemplary embodiment are intended to designate the presence of indicated features, numbers, steps, operations, components, parts, or combinations thereof, but do not exclude the presence or addition of one or more features, numbers, steps, operations, components, parts, or combinations thereof.

Unless otherwise defined, all terms used herein, including technical and scientific terms, have the same meanings as commonly understood by those skilled in the art to which an exemplary embodiment of the present disclosure pertains. Terms such as those defined in commonly used dictionaries should be interpreted as having meanings consistent with their meanings in the context of the related technology. Furthermore, unless explicitly defined in the exemplary embodiment, the terms should not be interpreted in an ideal or overly formal sense.

A control unit (controller) according to various exemplary embodiments of the present disclosure may be implemented by an algorithm configured to control the operation of various components of a vehicle, a nonvolatile memory configured to store data related to software instructions that execute the algorithm, or a processor configured to perform operations described below using the data stored in the memory. Here, the memory and the processor may be implemented as separate chips. Alternatively, the memory and the processor may be implemented as a single chip in which the memory and the processor are integrated with each other. The processor may take the form of one or more processors.

Hereinafter, a foldable pedal device for a vehicle according to various exemplary embodiments of the present disclosure will be described with reference to the accompanying drawings.

As shown in FIGS. 1 to 14, the foldable pedal device configured for the vehicle according to an exemplary embodiment of the present disclosure includes a pedal housing 100 fixed in a lower space of a driver's seat, a pedal pad 300 rotatably coupled to the pedal housing 100 using a hinge pin 200 and operated by a driver, a spring module 400 configured to provide an elastic force to the pedal pad 300 so that the pedal pad 300 protrudes from the pedal housing 100, and a moving stopper 600 configured to be linearly moved by power of an actuator 500 fixed to the pedal housing 100.

In an autonomous driving situation of the vehicle, movement of the moving stopper 600 by operation of the actuator 500 causes the pedal pad 300 to rotate forwards to be inserted into the pedal housing 100 and to be positioned therein. Accordingly, the pedal pad 300 enters a hidden state so that the same cannot be operated by the driver. (Refer to FIG. 11, FIG. 12, FIG. 13 and FIG. 14).

When the pedal pad 300 is in the hidden state, the pedal pad 300 is inserted into the pedal housing 100 so that the same is not exposed to a field of view of a driver or a passenger.

In a manual driving mode, the pedal pad 300 rotates rearwards and protrudes from the pedal housing 100 by the movement of the moving stopper 600 by the operation of the actuator 500 and the elastic force of the spring module 400. Accordingly, the pedal pad 300 protrudes into an indoor space, and accordingly, the pedal pad 300 enters a pop-up state in which the same may be operated by the driver (refer to FIG. 2, FIG. 3, FIG. 4, FIG. 5, FIG. 6, and FIG. 7).

The pedal housing 100 is formed in a box shape having an empty space therein. In the internal space of the pedal housing 100, the pedal pad 300, the high-load spring module 400, the actuator 500, the moving stopper 600 and a hysteresis lever to be described later, a stroke sensor, a printed circuit board (PCB), and the like are provided. Furthermore, the pedal housing 100 has a cover 110 provided at each of opposite sides thereof, the cover 110 being coupled to the pedal housing 100 in a detachable structure.

The foldable pedal device configured for the vehicle according to an exemplary embodiment of the present disclosure further includes a hysteresis lever 700 located in the pedal housing 100 and configured to be rotatably provided with respect to the pedal housing 100, the hysteresis lever 700 including an upper portion thereof inserted into the pedal pad 300 to contact with an internal surface of the pedal pad 300 and generating hysteresis by frictional force with the pedal pad 300 when the pedal pad 300 rotates.

The pedal pad 300 includes a box-shaped pad portion 310 including a pad surface 311 operated by the foot of a driver, the box-shaped pad portion 310 including one end portion of the spring module 400 inserted thereinto to be rotatably provided therein and including an upper portion of the hysteresis lever 700 inserted thereinto to be in contact therewith, and a pedal arm portion 320 including one end portion connected to the pad portion 310 and the other end portion coupled to the hinge pin 200, the pedal arm portion 320 being connected to a stroke sensor 800.

The pad portion 310 and the pedal arm portion 320 are connected to each other in an L-shape when viewed from the side, forming an organ-type pedal device.

The pad portion 310 passes through a housing hole 120 formed in the pedal housing 100 to be inserted into the pedal housing 100 or protrudes from the pedal housing 100 according to rotation of the pedal pad 300. The pedal arm portion 320 is configured to always be located in the pedal housing 100 regardless of the rotation of the pedal pad 300.

The pad portion 310 has a structure in which only a lower portion thereof, into which the spring module 400 and the hysteresis lever 700 are inserted, is opened, and all other portions thereof are sealed to prevent foreign substances from entering the inside of the pedal housing 100.

The pedal pad 300 has a rear end portion of the pedal arm portion 320 coupled thereto to be rotatable in a forward-and-rearward direction with respect to the pedal housing 100 around the hinge pin 200. When the pedal arm portion 320 rotates forwards, the pad portion 310 spaced forwards from the hinge pin 200 is inserted into the pedal housing 100 through the housing hole 120 formed in the pedal housing 100. Furthermore, when the pedal arm portion 320 rotates rearwards, the pad portion 310 protrudes from the pedal housing 100 toward the rear side at which the driver is present and is exposed.

Upper and lower surfaces of the pad portion 310 are formed in an arc shape including the same trajectory as a rotation radius of the pedal pad 300 with respect to the hinge pin 200, making it possible to maintain a constant gap between the same and the housing hole 120 formed in the pedal housing 100. In the present manner, it is possible to prevent foreign substances from entering the inside of the pedal housing 100 through the housing hole 120 as much as possible.

The pad portion 310 is provided to pass through the housing hole 120 formed in the pedal housing 100. Accordingly, the pad portion 310 is inserted into the pedal housing 100 or protrudes therefrom according to the rotation of the pedal pad 300. Meanwhile, the pedal arm portion 320 is always located in the pedal housing 100 regardless of the rotation of the pedal pad 300, preventing the same from contacting with the driver.

Therefore, when the driver operates the pedal pad 300 with his or her foot, the driver may operate only the pad surface 311 of the pad portion 310 exposed from the pedal housing 100 and may not operate the pedal arm portion 320 located in the pedal housing 100 because the same is prevented from contacting with the driver's foot, making it possible to prevent the driver from performing erroneous operation of the pedal.

According to an exemplary embodiment of the present disclosure, a foreign substance entrance prevention guide 130 is coupled to the housing hole 120 formed in the pedal housing 100 along the edge portion of the housing hole 120.

The foreign substance entrance prevention guide 130 is configured to eliminate a gap between the housing hole 120 of the pedal housing 100 and the pad portion 310 of the pedal pad 300, preventing foreign substances from entering the inside of the pedal housing 100 through the housing hole 120.

The foreign substance entrance prevention guide 130 is formed of a rubber material having elasticity to prevent wear and noise caused by contact between the same and the pad portion 310, but is not limited thereto.

A foreign substance discharge hole, configured to discharge the foreign substances introduced into the pedal housing 100 to the outside, may be formed in an internal bottom surface of the pedal housing 100.

The spring module 400 is a high-load spring module and is provided to be obliquely located along a direction in which the pad portion 310 moves. The spring module 400 has an upper end portion inserted into the pad portion 310 of the pedal pad 300 and rotatably coupled to the pad portion 310, and a lower end portion provided to be rotatable while remaining in contact with the hysteresis lever 700.

A pedal device of the vehicle requires a high load to secure safety during operation thereof. To the present end, the exemplary embodiment of the present disclosure is configured to use the spring module 400 having a high load, implementing a required pedal effort by use of the high-load spring module 400.

The high-load spring module 400 may be configured to implement a pedal effort by generally providing two or more springs and two or more dampers that are provided in series.

As described above, the high-load spring module 400 is formed of two or more springs provided in series. Accordingly, even if any one of the springs is broken during use, the pedal pad 300 may smoothly return to an initial position thereof by spring force of the remaining unbroken springs.

The actuator 500 according to an exemplary embodiment of the present disclosure includes a motor 510 fixed to the pedal housing 100, the motor 510 being rotatable in a clockwise direction or a counterclockwise direction, a lead screw 520 configured to be rotated by power of the motor 510 and screwed to the moving stopper 600, and a gear member 530 configured to transmit the power of the motor 510 to the lead screw 520.

The motor 510 may be formed as a dual type to implement a fail-safe. Here, when one of the two rotation motors breaks down, the moving stopper 600 may be moved by allowing the other motor that has not broken down to rotate the lead screw 520.

The operation of the motor 520 may be configured to be controlled by a printed circuit board (PCB) to be described later.

The moving stopper 600 according to an exemplary embodiment of the present disclosure includes a moving portion 610 screwed to the lead screw 520 and configured to move linearly in a longitudinal direction of the lead screw 520 when the lead screw 520 rotates, and a stopper portion 620 including one end portion connected to the moving portion 610 and the other end portion crossing the pedal arm portion 320 to contact with an upper surface of the pedal arm portion 320.

The lead screw 520 is screwed to the moving portion 610 while penetrating the moving portion 610 in the forward-and-rearward direction thereof. The stopper portion 620 is formed in a U-shape, and has opposite end portions connected to the moving portion 610 and a middle portion configured to be in contact with the upper surface of the pedal arm portion 320.

That is, when the pedal pad 300 is in a pop-up state, in a hidden state, in a transition state from the pop-up state to the hidden state, and in a transition state from the hidden state to the pop-up state, the pedal arm portion 320 and the stopper portion 620 of the moving stopper 600 are in contact with each other.

Furthermore, when a driver does not operate the pedal pad 300 in the pop-up state, the pedal arm portion 320 and the stopper portion 620 of the moving stopper 600 remain in contact with each other. Meanwhile, when the driver operates the pedal pad 300 in the pop-up state and the pedal pad 300 rotates forwards, contact between the pedal arm portion 320 and the stopper portion 620 of the moving stopper 600 is released (refer to FIG. 8 and FIG. 9).

When the driver depresses the pedal pad 300 in the pop-up state to operate the same, the pedal pad 300 rotates forwards around the hinge pin 200. Meanwhile, when operating force of the driver is released from the pedal pad 300, the pedal pad 300, which has been rotated forwards, rotates rearwards around the hinge pin 200 by the elastic force of the spring module 400, returning to an initial position thereof. Here, when the pedal pad 300 returns to the initial position thereof, the stopper portion 620 of the moving stopper 600 contacts with the pedal arm portion 320 to restrict the rotation of the pedal pad 300, regulating the initial position of the pedal pad 300.

The moving stopper 600 according to an exemplary embodiment of the present disclosure further includes a circular protrusion 630 provided at a bottom portion of the moving portion 610 and configured to make line contact with the pedal housing 100.

When the actuator 500 is operated, the moving stopper 600 moves linearly in the longitudinal direction of the lead screw 520. Here, the moving stopper 600 move in a state of contacting with the pedal housing 100 for stable movement thereof.

Furthermore, to minimize contact between the moving stopper 600 and the pedal housing 100 and to minimize interference caused by friction therebetween during linear movement of the moving stopper 600, the moving stopper 600 and the pedal housing 100 make line contact with each other. To the present end, the moving stopper 600 is characterized in that the circular protrusion 630 is provided at the bottom portion of the moving portion 610 to make line contact with the pedal housing 100.

The moving portion 610 and the circular protrusion 630 may be formed to be integrated with each other. If necessary, the moving portion 610 and the circular protrusion 630 may be individually formed and assembled with each other.

According to the present disclosure, a bending portion 330 bent at a predetermined angle is provided at the pedal arm portion 320 of the pedal pad 300 so that the stopper portion 620 contacts with an upper surface 331 of the bending portion 330.

The upper surface 331 of the bending portion 330 is located above a movement trajectory M1 of the stopper portion 620 and is formed not to be parallel to the movement trajectory M1. Accordingly, the upper surface 331 of the bending portion 330 is formed to have a predetermined angle between the same and the movement trajectory M1 while being located above the movement trajectory M1.

Therefore, when the moving stopper 600 moves rearwards along the lead screw 520 by the operation of the actuator 500, the stopper portion 620 of the moving stopper 600 presses the upper surface 331 of the bending portion 330 and pushes the same. In the instant case, the pedal pad 300 rotates forwards around the hinge pin 200 and the pad portion 310 is inserted into the pedal housing 100, entering the hidden state.

According to an exemplary embodiment of the present disclosure, a rubber damper 900 is coupled to the moving portion 610 of the moving stopper 600. Here, when the driver operates the pedal pad 300 in the pop-up state and the pedal pad 300 rotates forwards, the rubber damper 900 is elastically deformed by contacting with the pedal arm portion 320 to generate a pedal effort.

The rubber damper 900 is formed in a conical shape including a pointed end portion in contact with the pedal arm 320. Accordingly, in the initial stage of contacting with the pedal arm portion 320, a deformed area of the rubber damper 900 is small so that the pedal effort increases little by little, and later, the deformed area thereof becomes large so that the pedal effort rapidly increases, making it possible to generate a final pedal effort having the greatest pedal effort when the pedal pad 300 is operated.

The hysteresis lever 700 according to an exemplary embodiment of the present disclosure has an L-shaped type, and a rear end portion thereof is provided to be rotatable with respect to the pedal housing 100, the rear end portion thereof rotating around a lever shaft 710.

The lever shaft 710 may be formed to be integrated with the pedal housing 100, or may be formed as a separate part separated from the pedal housing 100 to be fixedly coupled to the pedal housing 100.

The lever shaft 710 passes through the rear end portion of the hysteresis lever 700, and accordingly, the hysteresis lever 700 is provided in a structure configured to rotate around the lever shaft 710.

When opposite end portions (upper and lower end portions) of the spring module 400 are provided to be supported by the pad portion 310 of the pedal pad 300 and the hysteresis lever 700, the upper end portion of the hysteresis lever 700 always remains in a state of contacting with the pad portion 310 by spring force of the spring module 400. Accordingly, hysteresis may be implemented when the pedal pad 300 rotates, and an initial operation force of the pedal pad 300 may be generated by the spring force of the spring module 400.

The pedal device according to an exemplary embodiment of the present disclosure has a structure in which the spring force of the spring module 400 increases when the driver operates the pedal pad 300 and the pad portion 310 rotates to be inserted into the pedal housing 100, and force of the hysteresis lever 700 pressing the pad portion 310 by the spring force increases so that frictional force increases, implementing hysteresis when the pedal pad 300 is operated by the increasing frictional force.

According to an exemplary embodiment of the present disclosure, an avoidance hole 340 is formed in the pedal arm portion 320 of the pedal pad 300. Here, when the moving stopper 600 moves rearwards in the longitudinal direction of the lead screw 520 by the operation of the actuator 500, the pedal pad 300 rotates forwards to be inserted into the pedal housing 100, entering the hidden state. In the instant case, the rubber damper 900 is inserted into the avoidance hole 340.

The avoidance hole 340 may be formed in the pedal arm portion 320 to be located between the bending portion 330 and the pad portion 310.

The avoidance hole 340 is formed to be greater than the rubber damper 900, preventing the rubber damper 900 from being deformed by the pedal arm 320 when the rubber damper 900 is inserted into the avoidance hole 340.

That is, when the pedal pad 300 is in the hidden state, the rubber damper 900 is inserted into the avoidance hole 340 so as not to be pressed by the pedal arm portion 320, preventing deformation of the rubber damper 900. Accordingly, it is possible to improve durability of the rubber damper 900 and to prevent permanent deformation thereof. In the hidden state of the pedal pad 300, the pedal pad 300 may be rotated in consideration of only the spring force of the spring module 400, including an effect of minimizing capacity of the actuator 500.

The foldable pedal device configured for the vehicle according to an exemplary embodiment of the present disclosure further includes a plurality of stroke sensors 800 fixed in the pedal housing 100, connected to the pedal pad 300, and configured to generate a signal related to a pedal function when the pedal pad 300 rotates.

The stroke sensor 800 includes a sensor lever 810 rotatably coupled thereto. The sensor lever 810 is coupled to a sensor pin 350 provided in the pedal pad 300. Here, when the pedal pad 300 rotates with respect to the pedal housing 100, the sensor lever 810 rotates through the sensor pin 350.

The sensor pin 350 is located above the hinge pin 200 coupled to the pedal arm portion 320, and is formed to protrude from each of the opposite sides of the pedal arm portion 320.

Because the sensor pin 350 is provided in the pedal arm portion 320, a position of the stroke sensor 800 may be brought closer to the side of the pedal arm portion 320, reducing the overall size.

The stroke sensor 800 is configured to detect whether the pedal pad 300 returns to the initial position thereof when the pedal pad 300 rotates, and to detect rotation of the pedal pad 300 when the driver depresses the pedal pad 300 to operate the same.

The stroke sensor 800 includes a permanent magnet and a PCB facing the permanent magnet. Accordingly, when the pedal pad 300 is rotated by the driver's operation, the stroke sensor 800 detects a rotation angle of the pedal pad 300 through a change in intensity of magnetic field depending on a change in position of the permanent magnet, generating a signal related to a pedal function.

The stroke sensor 800 may be any one of an accelerator position sensor (APS) configured to generate a signal related to acceleration and a brake position sensor (BPS) configured to generate a signal related to braking.

Accordingly, the exemplary embodiment according to an exemplary embodiment of the present disclosure may use any one of an accelerator pedal device and a brake pedal device as an electronic foldable pedal device, or may use both the accelerator pedal device and the brake pedal device as the electronic foldable pedal device.

The stroke sensor 800 according to the exemplary embodiment of the present disclosure is a contact sensor connected to the pedal pad 300 through the sensor lever 810 including a mechanical structure. If necessary, the stroke sensor 800 may be configured as a non-contact sensor including only the permanent magnet and the PCB.

The foldable pedal device according to an exemplary embodiment of the present disclosure further includes a permanent magnet 1000 coupled to the pedal pad 300 toward the pedal housing 100, and a printed circuit board (PCB) 1100 coupled to the pedal housing 100 to face the permanent magnet 1000. In the instant case, the PCB 1100 recognizes a change in magnetic flux of the permanent magnet 1000 and generates a signal related to a pedal function when the pedal pad 300 rotates. Here, the signal related to the pedal function may be a signal related to braking or a signal related to acceleration.

The permanent magnet 1000 is formed in plural, and is configured to be located in the bending portion 330 of the pedal arm portion 320.

The PCB 1100 may also have a function of controlling operation of the actuator 500. To the present end, the PCB 1100 and the actuator 500 are electrically connected to each other to transmit a signal and receive the same, and the actuator 500 is configured to be electrically connected to a power supply for the operation thereof.

FIG. 11, FIG. 12, FIG. 13 and FIG. 14 show the hidden state in which the pedal pad 300 is inserted into the pedal housing 100 and positioned therein, and accordingly, the pedal pad 300 is not exposed to a driver.

When the moving stopper 600 moves rearwards along the lead screw 520 by the operation of the actuator 500, the stopper portion 620 of the moving stopper 600 presses the upper surface 331 of the bending portion 330 to push the same. In the instant case, the pedal pad 300 rotates forwards around the hinge pin 200 so that the pad portion 310 is inserted into the pedal housing 100. Accordingly, the pedal pad 300 is in the hidden state in which the pad portion 310 is inserted into the pedal housing 100 and positioned therein, and accordingly, the driver cannot operate the same.

When the pedal pad 300 is in the hidden state, the lower space of the driver's seat becomes a large space without any interference with the pedal, allowing the driver to comfortably rest in a relaxation mode. Furthermore, it is possible to improve safety by preventing erroneous operation of the pedal in the autonomous driving situation.

FIG. 2, FIG. 3, FIG. 4, FIG. 5, FIG. 6, and FIG. 7 show the pop-up state in which the pedal pad 300 protrudes from the pedal housing 100 and protrudes into the vehicle interior space, and accordingly, the same is exposed to a driver.

When the moving stopper 600 moves forwards along the lead screw 520 by the operation of the actuator 500 in the hidden state, the pedal pad 300 rotates rearwards around the hinge pin 200 by the elastic force of the spring module 400 and protrudes from the pedal housing 100. Accordingly, the pedal pad 300 protrudes into the vehicle interior space and is exposed to the driver, and accordingly, the pedal pad 300 is changed to the pop-up state in which the driver can operate the same.

As described above, the position of the permanent magnet 1000 changes when the pedal pad 300 rotates to enter the hidden state or the pop-up state by the movement of the moving stopper 600 by the operation of the actuator 500. In the instant case, the PCB 1100 does not generate the signal related to the pedal function to prevent erroneous operation.

Figure 8:
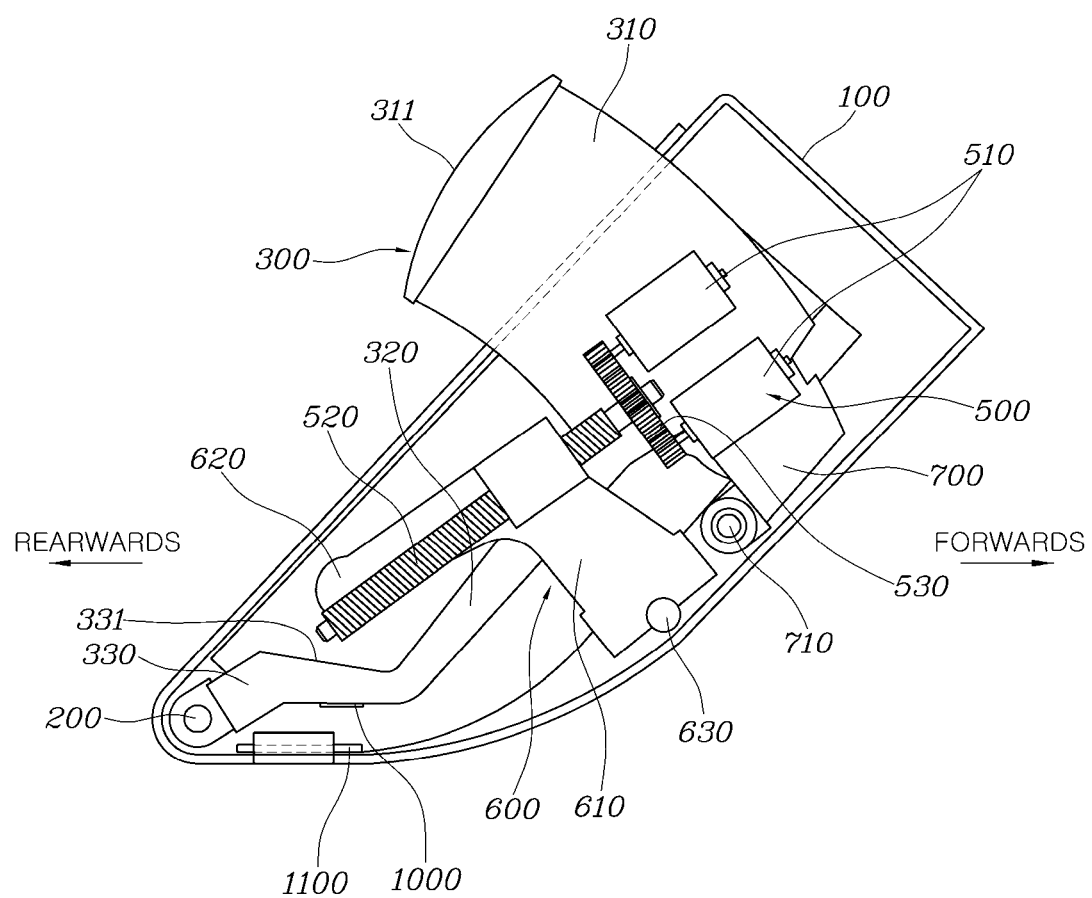
FIG. 8, FIG. 9 and FIG. 10 are views showing a normal operating state in which a driver operates the pedal pad in a pop-up state in FIG. 3 with his or her feet so that the pedal pad is rotated.
Figure 9:
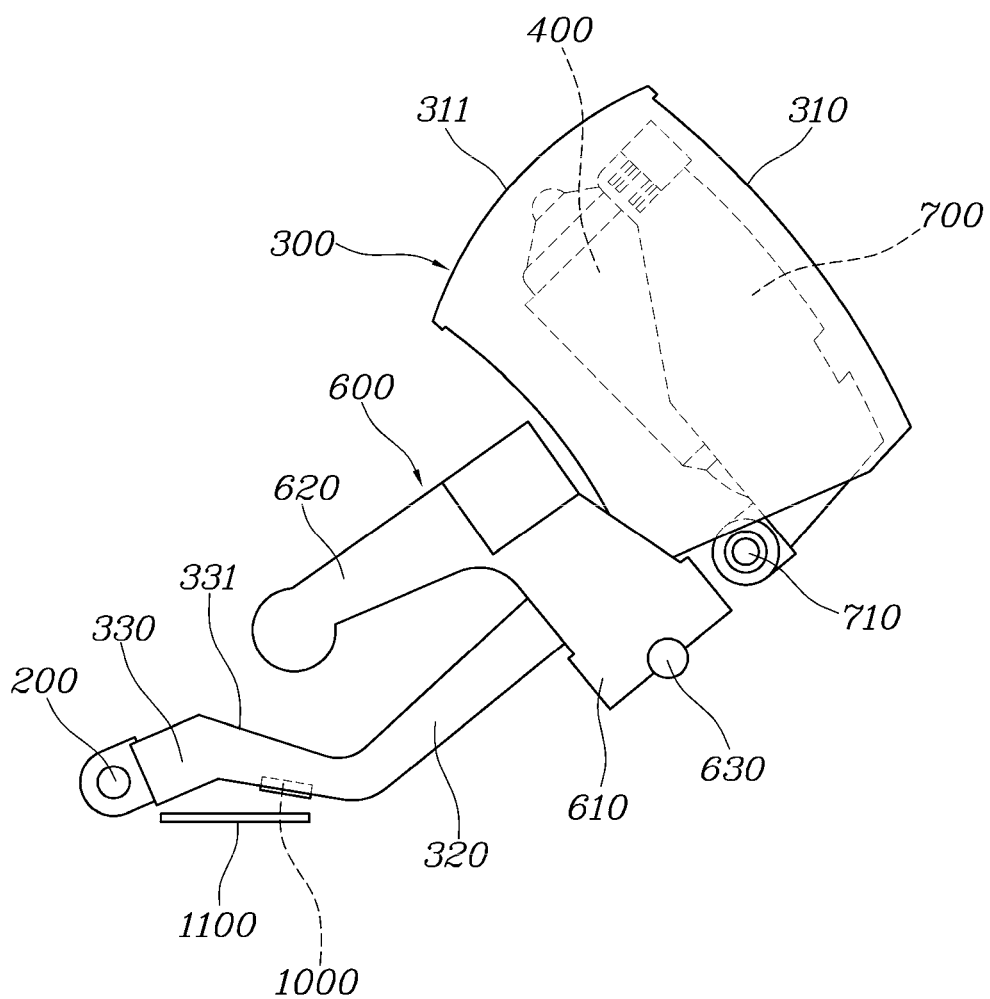
Figure 10:
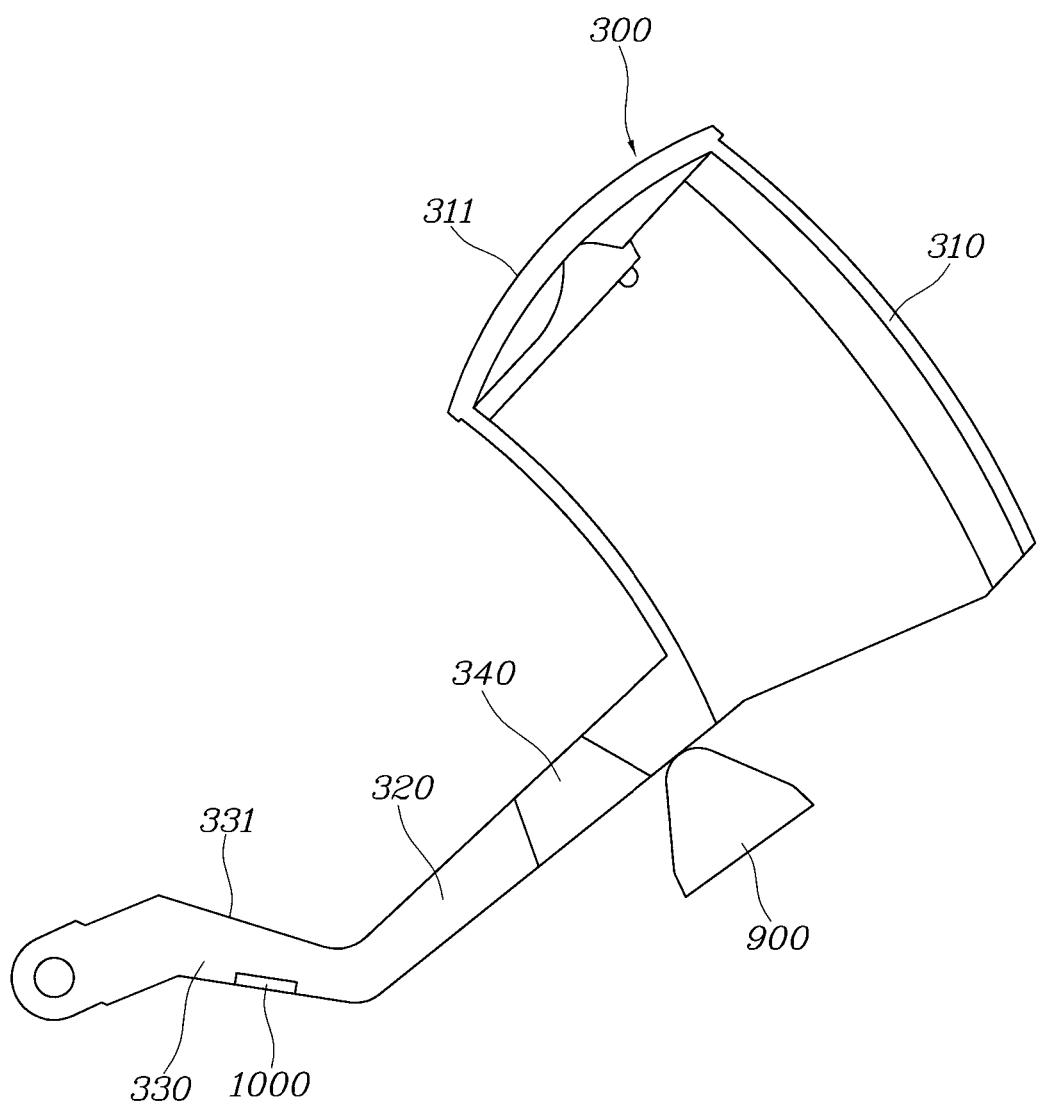
Figure 11:
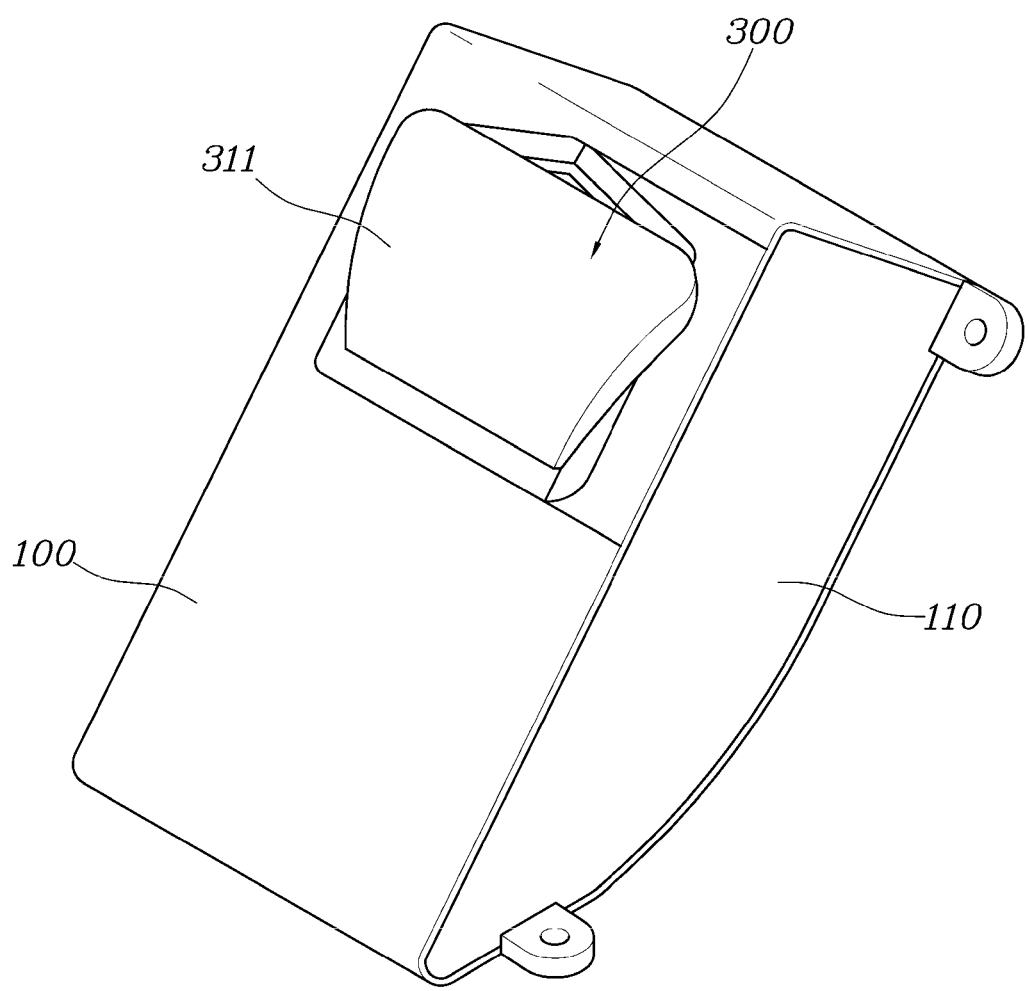
FIG. 11, FIG. 12, FIG. 13 and FIG. 14 are views showing a hidden state of the pedal pad according to an exemplary embodiment of the present disclosure.
Figure 12:
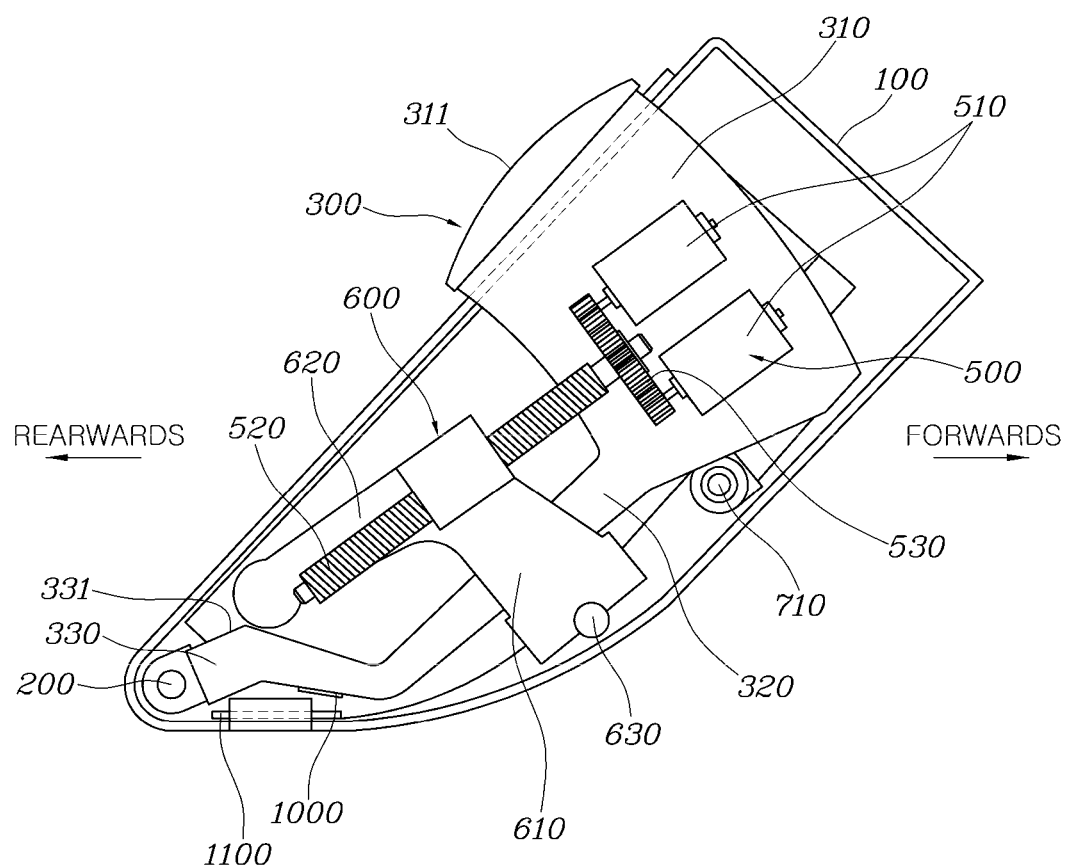
Figure 13:
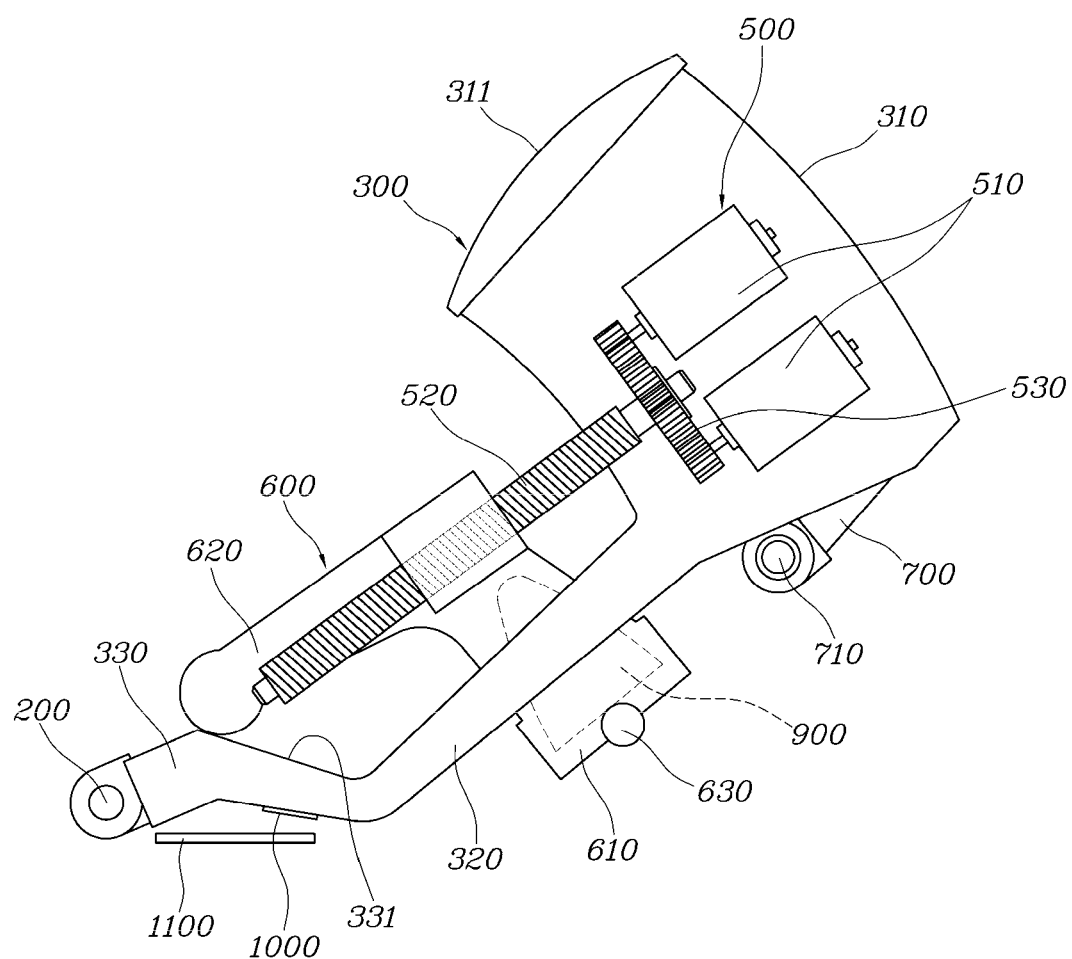
Figure 14:
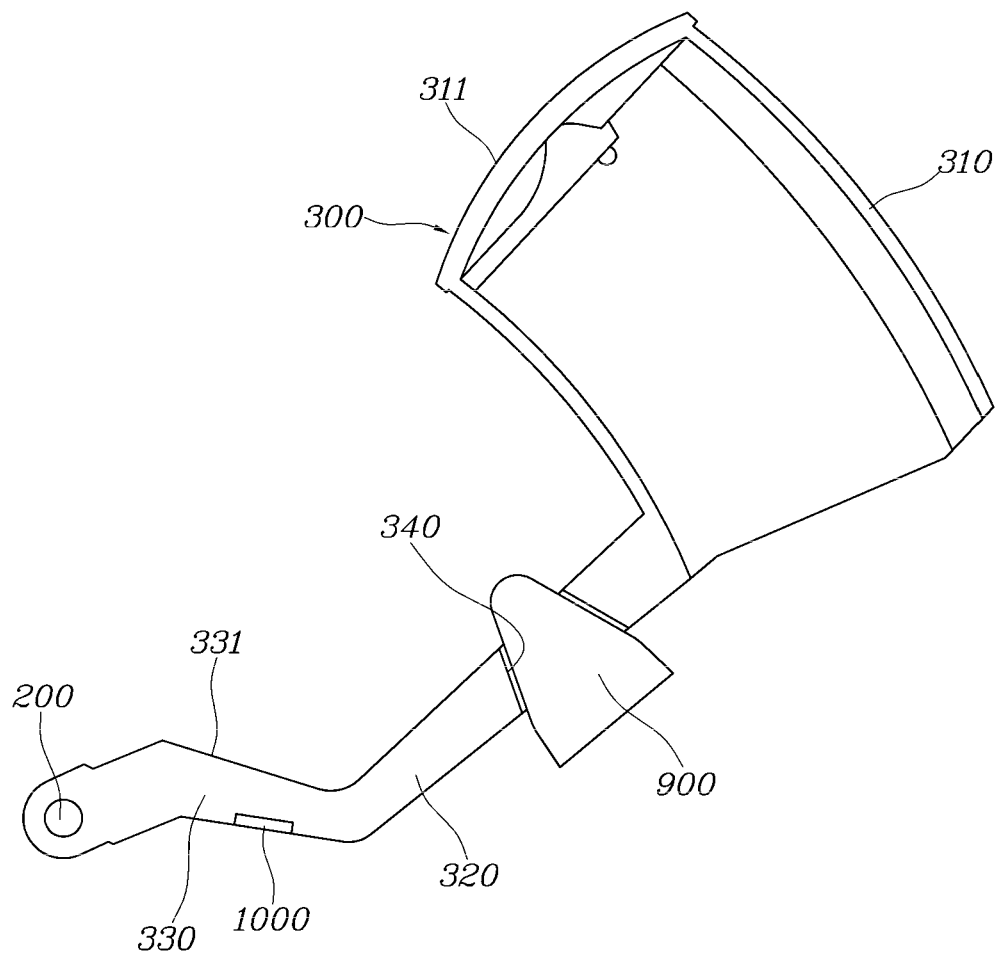

FIG. 8, FIG. 9 and FIG. 10 show a normal operating state in which the driver depresses the pedal pad 300 in the pop-up state to operate the same and then the pedal pad 300 is rotated forwards.

As described above, when the pedal pad 300 is in the pop-up state, the driver depresses the protruding pedal pad 300 to perform a normal operation.

When the pedal pad 300 is normally operated, it is possible to implement the pedal effort and the hysteresis through the spring module 400, the rubber damper 900, and the hysteresis lever 700.

When the pedal pad 300 rotates forwards by the driver's operation in the state in which the pedal pad 300 pops up, the position of the permanent magnet 1000 changes. Here, the PCB 1100 recognizes a change in magnetic flux depending on a change in position of the permanent magnet 1000, and generates a signal related to a pedal function (a signal related to acceleration or a signal related to braking), performing more stable operation.

As described above, in the foldable pedal device according to an exemplary embodiment of the present disclosure, the pedal pad 300 protrudes toward a driver to be exposed (to pop up) to allow the driver to operate the same in a manual driving mode in which the driver directly drives a vehicle. Meanwhile, the pedal pad 300 is hidden and is not exposed to the driver so that the driver is not allowed to operate the same in an autonomous driving situation. Accordingly, in the autonomous driving situation, the driver may comfortably rest, and furthermore, it is possible to improve safety by preventing erroneous operation of the pedal in the autonomous driving situation.

Furthermore, the foldable pedal device according to an exemplary embodiment of the present disclosure is configured to implement a folding function of the pedal by movement of the moving stopper 600 by operation of the actuator 500. Accordingly, the number of components may be minimized by simplifying a mechanism of the folding function thereof as much as possible, making it possible to reduce costs and weight and to simplify layout.

Furthermore, the foldable pedal device according to an exemplary embodiment of the present disclosure is an organ-type electronic pedal device including the high-load spring module 400 and the hysteresis lever 700, and is configured to tune a pedal effort, a stroke, and a hysteresis operation force, which are differently required depending on vehicle models, by changing a component of the hysteresis lever 700, achieving cost reduction.

As is apparent from the above description, a foldable pedal device according to an exemplary embodiment of the present disclosure is configured to cause a pedal pad to protrude toward a driver to be exposed (to pop up) so that the driver can operate the same in a manual driving mode in which the driver directly drives the vehicle, and to cause the pedal pad to be hidden so that the pedal pad is not exposed to the driver and the driver cannot operate the same in an autonomous driving situation. Accordingly, in the autonomous driving situation, the driver may comfortably rest, and furthermore, it is possible to improve safety by preventing erroneous operation of the pedal in the autonomous driving situation.

Furthermore, the foldable pedal device according to an exemplary embodiment of the present disclosure is configured to implement a folding function of the pedal by movement of a moving stopper by operation of an actuator, and to minimize the number of components by simplifying a mechanism of the folding function thereof as much as possible, having an effect of reducing costs and weight and simplifying layout.

Additionally, the foldable pedal device according to an exemplary embodiment of the present disclosure is an organ-type electronic pedal device including a high-load spring module and a hysteresis lever, and is configured to tune a pedal effort, a stroke, and a hysteresis operation force, which are differently required depending on vehicle models, by changing a component of the hysteresis lever, achieving cost reduction.

Furthermore, the PCB may include a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A foldable pedal apparatus for a vehicle, the foldable pedal apparatus comprising:
    a pedal housing;
    a pedal pad rotatably coupled to the pedal housing and configured to be operated in response to a driver's activation;
    a spring module engaged to the pedal pad and configured to provide an elastic force to the pedal pad so that the pedal pad protrudes from the pedal housing by the elastic force of the spring module; and
    a moving stopper coupled to an actuator and configured to be linearly moved by power of the actuator fixed to the pedal housing,
    wherein the pedal pad rotates in a first direction to be inserted into the pedal housing by movement of the moving stopper, entering a hidden state configured to prevent the driver from operating the pedal pad in an autonomous driving situation of the vehicle, and
    wherein the pedal pad rotates in a second direction to protrude from the pedal housing by movement of the moving stopper and the elastic force of the spring module, entering a pop-up state configured to allow the driver to operate the pedal pad in a manual operation mode of the vehicle,
    wherein the pedal pad includes:
        a pad portion including a pad surface configured to be pressed by the driver, wherein one end portion of the spring module is inserted into and provided in the pad portion, and
        a pedal arm portion including a first end portion connected to the pad portion and a second end portion pivotally coupled to the pedal housing.

2. The foldable pedal apparatus of claim 1, further including:
    a hysteresis lever rotatably provided on the pedal housing, the hysteresis lever including an upper portion inserted into the pedal pad to contact with an internal surface of the pedal pad and generating hysteresis by frictional force with the pedal pad when the pedal pad rotates.

3. The foldable pedal apparatus of claim 2,
    wherein the upper portion of the hysteresis lever is inserted into the pad portion and contacts with the spring module.

4. The foldable pedal apparatus of claim 1, wherein the pedal arm portion and the moving stopper contact each other when the pedal pad is in the pop-up state, in the hidden state, in a transition state from the pop-up state to the hidden state, and in a transition state from the hidden state to the pop-up state.

5. The foldable pedal apparatus of claim 1,
    wherein the pedal arm portion and the moving stopper contact each other when the driver does not operate the pedal pad in the pop-up state, and
    wherein contact between the pedal arm portion and the moving stopper is released when the driver operates the pedal pad in the pop-up state and the pedal pad rotates in the first direction.

6. The foldable pedal apparatus of claim 1, further including:
    a permanent magnet coupled to the pedal pad; and
    a printed circuit board (PCB) coupled to the pedal housing to face the permanent magnet,
    wherein the PCB is configured to recognize a change in magnetic flux of the permanent magnet when the pedal pad rotates, and generates a signal related to a pedal function.

7. The foldable pedal apparatus of claim 6, wherein the PCB does not generate the signal related to the pedal function to prevent erroneous operation when the pedal pad rotates to enter the hidden state or the pop-up state by movement of the moving stopper according to operation of the actuator and as such a position of the permanent magnet changes.

8. The foldable pedal apparatus of claim 6, wherein the PCB is configured to generate the signal related to the pedal function only when the pedal pad protrudes from the pedal housing to be in the pop-up state and a position of the permanent magnet changes while the pedal pad rotates in the first direction in response to operation of the driver in a non-operating state of the actuator.

9. The foldable pedal apparatus of claim 1, wherein the actuator includes:
    a motor fixed to the pedal housing, the motor being rotatable in a clockwise direction or a counterclockwise direction,
    a lead screw configured to be rotated by power of the motor and screwed to the moving stopper, and
    a gear member gear-engaged between the lead screw and the motor and configured to transmit the power of the motor to the lead screw through the gear member.

10. The foldable pedal apparatus of claim 9, wherein the motor is formed of at least two motors.

11. The foldable pedal apparatus of claim 9, wherein the moving stopper includes:
    a moving portion screwed to the lead screw and configured to move linearly in a longitudinal direction of the lead screw when the lead screw rotates by the motor, and
    a stopper portion including a first end portion connected to the moving portion and a second end portion crossing a pedal arm portion of the pedal pad to slidably contact with an upper surface of the pedal arm portion,
    wherein the pedal arm portion includes a first end portion connected to a pad portion of the pedal pad and a second end portion pivotally coupled to the pedal housing.

12. The foldable pedal apparatus of claim 11, wherein the moving stopper further includes a circular protrusion provided at a bottom portion of the moving portion and configured to line-contact with the pedal housing.

13. The foldable pedal apparatus of claim 11,
    wherein the pedal arm portion includes a bending portion bent at a predetermined angle so that the second end portion of the stopper portion selectively contacts with an upper surface of the bending portion, and
    wherein the upper surface of the bending portion is formed not to be parallel to a movement trajectory of the stopper portion.

14. The foldable pedal apparatus of claim 11,
    wherein the moving portion includes a rubber damper coupled thereto, and
    wherein the rubber damper is elastically deformed by contacting with the pedal arm portion to generate a pedal effort when the driver operates the pedal pad in the pop-up state and the pedal pad rotates in the first direction.

15. The foldable pedal apparatus of claim 14,
wherein the pedal arm portion includes an avoidance hole formed therein, and
wherein the rubber damper is inserted into the avoidance hole when the moving stopper moves in the second direction and the pedal pad rotates in the first direction to be inserted into the pedal housing and to be in the hidden state.

16. The foldable pedal apparatus of claim 15, wherein the avoidance hole is formed to be greater than the rubber damper to prevent the rubber damper from being deformed by the pedal arm when the rubber damper is inserted into the avoidance hole.

17. The foldable pedal apparatus of claim 16,
wherein the rubber damper is formed in a conical shape including a pointed end portion to contact with the pedal arm.

18. The foldable pedal apparatus of claim 1, further including:
a plurality of stroke sensors fixed to the pedal housing, connected to the pedal pad, and configured to generate a signal related to a pedal function when the pedal pad rotates.

19. A foldable pedal apparatus for a vehicle, the foldable pedal apparatus comprising:
a pedal housing;
a pedal pad rotatably coupled to the pedal housing and configured to be operated in response to a driver's activation;
a spring module engaged to the pedal pad and configured to provide an elastic force to the pedal pad so that the pedal pad protrudes from the pedal housing by the elastic force of the spring module; and
a moving stopper coupled to an actuator and configured to be linearly moved by power of the actuator fixed to the pedal housing,
wherein the pedal pad rotates in a first direction to be inserted into the pedal housing by movement of the moving stopper, entering a hidden state configured to prevent the driver from operating the pedal pad in an autonomous driving situation of the vehicle,
wherein the pedal pad rotates in a second direction to protrude from the pedal housing by movement of the moving stopper and the elastic force of the spring module, entering a pop-up state configured to allow the driver to operate the pedal pad in a manual operation mode of the vehicle, and
wherein the actuator includes:
a motor fixed to the pedal housing, the motor being rotatable in a clockwise direction or a counterclockwise direction,
a lead screw configured to be rotated by power of the motor and screwed to the moving stopper, and
a gear member gear-engaged between the lead screw and the motor and configured to transmit the power of the motor to the lead screw through the gear member.

20. A foldable pedal apparatus for a vehicle, the foldable pedal apparatus comprising:
a pedal housing;
a pedal pad rotatably coupled to the pedal housing and configured to be operated in response to a driver's activation;
a spring module engaged to the pedal pad and configured to provide an elastic force to the pedal pad so that the pedal pad protrudes from the pedal housing by the elastic force of the spring module; and
a moving stopper coupled to an actuator and configured to be linearly moved by power of the actuator fixed to the pedal housing,
wherein the pedal pad rotates in a first direction to be inserted into the pedal housing by movement of the moving stopper, entering a hidden state configured to prevent the driver from operating the pedal pad in an autonomous driving situation of the vehicle,
wherein the pedal pad rotates in a second direction to protrude from the pedal housing by movement of the moving stopper and the elastic force of the spring module, entering a pop-up state configured to allow the driver to operate the pedal pad in a manual operation mode of the vehicle, and
wherein the foldable pedal apparatus further includes a hysteresis lever rotatably provided on the pedal housing, the hysteresis lever including an upper portion inserted into the pedal pad to contact with an internal surface of the pedal pad and generating hysteresis by frictional force with the pedal pad when the pedal pad rotates.

* * * * *